United States Patent [19]

Crum

[11] Patent Number: 4,760,494
[45] Date of Patent: Jul. 26, 1988

[54] CAPACITOR CONTAINING AN ADSORBENT MATERIAL

[75] Inventor: Robert C. Crum, Glens Falls, N.Y.

[73] Assignee: General Electric Company, King of Prussia, Pa.

[21] Appl. No.: 76,328

[22] Filed: Jul. 22, 1987

[51] Int. Cl.$^4$ .......................... H01G 1/11; H01G 9/00
[52] U.S. Cl. ....................................... 361/272; 361/433
[58] Field of Search ............................ 361/272, 433 M

[56] References Cited

U.S. PATENT DOCUMENTS

| | | | |
|---|---|---|---|
| 1,709,427 | 4/1929 | Bush | 361/433 X |
| 2,178,969 | 11/1939 | Ruben | 361/433 X |
| 3,311,697 | 3/1967 | Quinn | 361/272 X |
| 4,486,809 | 12/1984 | Deak et al. | 361/272 |
| 4,586,107 | 4/1986 | Price et al. | 361/272 |
| 4,683,516 | 7/1987 | Miller | 361/433 X |

OTHER PUBLICATIONS

Union Carbide Adsorbents & Catalysts, "Union Carbide Molecular Sieves", pp. 2-19.
Encyclopedia of Chemical Technology, vol. 15, pp. 638-669.
CECA Molecular Sieves.

*Primary Examiner*—Donald Griffin

[57] ABSTRACT

A capacitor which includes a housing, at least one device for storing and releasing electrical energy, at least two terminals and adsorbent material for adsorbing at least a portion of the contaminants in the housing to provide capacitors with a significantly longer useful life and less failure.

20 Claims, 4 Drawing Sheets

CAPACITOR CONTAINING AN ADSORBENT MATERIAL

FIELD OF THE INVENTION

The present invention is generally directed to electrical capacitors and particularly to capacitors which contain an adsorbent material which adsorbs contaminants therein to thereby significantly extend the useful life of the capacitor in electrical and/or electronic operations.

BACKGROUND OF THE INVENTION

Electrical capacitors are used to provide a start up voltage for a variety of electrical and electronic devices including household appliances, heating and air conditioning systems and power supplies for industrial uses.

A capacitor is generally formed by a housing such as a cylindrical shaped container made of aluminum having therein one or more capacitor rolls. The capacitor rolls are typically made of wound layers of an electrically inert or insulative material such as plastic (e.g. polypopylene) or paper having thereon a very thin layer of an electrically conductive material such as vaporized metal (e.g. zinc). The ends of the capacitor rolls are coated with a metallized layer (e.g. zinc). The metallized end is electrically connected to terminals to provide a pathway for the flow of an electric charge stored in the capacitor rolls to an electrical or electronic device connected to the terminals. Capacitors used for low output requirements do not have a container as such but instead employ an encapsulating layer of a synthetic material such as epoxy to encapsulate or house the components of the capacitor.

The capacitor may optionally be provided with a dieletric fluid (e.g. polypropylene glycol) which serves to suppress partial discharges in areas of high electrical stress and also functions as a heat transfer medium. Dielectric fluid containing capacitors are known as "wet" capacitors and capacitors which do not contain dielectric fluid are known as "dry" capacitors. The design requirements of a capacitor are in part dependent on the "capacitance" which is a measure of how much voltage the capacitor will retain which is typically in the range of 5 to 50 microfarads for many electrical and/or electronic applications.

Loss of capacitance leads to decreased efficiency and eventual breakdown of the capacitor. The leading cause of loss of capacitance is corrosion caused by the presence of contaminants which are primarily polar compounds and molecules present in the capacitor. These contaminants include, for example, water, carbon dioxide, ammonia, chlorine gas, sulfur dioxide and others. Contaminants may be present in the capacitor at the time of manufacture, as for example, the presence of moisture in the housing and from soldering operations used to electrically connect the capacitor rolls to the terminals.

Such contaminants tend to corrode the thin metal layers of the capacitor rolls thereby reducing the surface area of the metallized layers. Since the amount of capacitance is directly proportional to the surface area of the metallized layers, a resultant reduction in surface area leads to a reduction in capacitance.

Another factor in rating the quality of a capacitor is the so called "dissipation factor" which is a measure of the percentage of electrical energy lost by the capacitor over time.

All capacitators tend to lose some amount of electrical energy. In some cases the lost electrical energy is transformed into heat energy which is evidenced by a heat rise within the capacitor. The lower the dissipation factor, the longer the life span of a capacitor. In addition, the dissipation factor tends to increase over time since lost electrical energy is often caused by the same factors which give rise to a loss of capacitance (i.e. corrosion caused by the presence of contaminants especially polar compounds and molecules.

Heretofore efforts at reducing corrosion within the capacitor housing have focused on increasing the efficiency of sealing the cover having thereon electrical terminals to the container which contains the capacitor rolls. Better seals and more rapid and efficient sealing processes, however, have not been successful in eliminating the corrosive effect of contaminants contained within the sealed capacitor. As a result, present day capacitors have a limited useful life.

It is therefore an object of the invention to provide an electrical capacitor which has a significantly longer useful life than present capacitors.

It is a further object of the invention to provide an electrical capacitor which includes therein an adsorbent material capable of adsorbing contaminants thereby reducing corrosion within the capacitor.

It is a still further object of the invention to provide an electrical capacitor which is highly resistant to a loss of capacitance and has a significantly lower dissipation factor.

SUMMARY OF THE INVENTION

The present invention is directed to an electrical capacitor which includes a housing, means within the housing for storing and releasing electrical energy, and at least two terminals which are electrically connected to the electrical energy storing means. The present invention is particularly directed to an adsorbing means which is placed in the housing for adsorbing therein at least a portion of the contaminants present in the capacitor.

In a preferred form of the invention, the adsorbing means is at least one adsorbent material selected from synthetic and natural zeolites, diatomaceous earth, activated carbon and alumina. The zeolites are preferably those which contain at least a predominant amount of crystalline sodium aluminasilicate.

For ease in facilitating adsorption and the addition of the adsorbent material into the capacitor, the adsorbent material is preferably in the form of a powder, beads or pellets. The mean pore size of the adsorbent material must be of sufficient size to adsorb the contaminants in the capacitor. For example, an adsorbent material having a mean pore size of about 4.0 Angstroms can be used to adsorb water having a molecular diameter of about 3.8 Angstroms. Adsorbent materials can be selected in accordance with the present invention to adsorb a variety of contaminants such as carbon dioxide (molecular diameter 3.34 Angstroms), ammonia (molecular diameter 3.0 Angstroms), hydrogen chloride (molecular diameter 1.3 Angstroms), chlorine gas (molecular diameter 2.0 Angstroms), sulfur dioxide (molecular diameter $<4.0$ Angstroms), and isopropanol (molecular diameter $>4.0$ Angstroms). Other contaminants which may be present in a capacitor include formaldehyde, sodium chloride, trichloromethane and carbon tetrachloride.

Accordingly, the mean pore size of the adsorbent material is selected to enable the adsorption of whatever contaminants are present in the capacitor. It is therefore within the scope of the invention to employ more than one adsorbent material, each having a mean pore size specific for one or more contaminants.

The amount of adsorbent material used is dependent on the size of the capacitor, the materials used to make the capacitor and the adsorbing capacity of the adsorbent material. The adsorbing capacity of the adsorbent material is dependent on the presence or absence of non-adsorbing materials therein such as clay and the amount of adsorbance of the material during handling prior to placement in the capacitor. This is of particular importance for materials which readily adsorb moisture from the atmosphere.

Since the adsorbent material does not adversely affect the electrical characteristics of the capacitor, the amount of adsorbent material may exceed the theoretical amount needed to adsorb the contaminant within the capacitor. From an economic view, it is of course desirable to add only so much of the adsorbent material as is necessary to adsorb the contaminant. Determination of the theoretical amount of each contaminant in a capacitor is readily determined by those skilled in the art. In a typical capacitor application 4.0 to 4.5 grams of the adsorbent material is sufficient for purposes of the invention. It is to be understood that the amount of one or more adsorbent materials needed can be readily determined and tailored to the specific capacitor employed.

The adsorbent material may be added to the capacitor at any time but preferably prior to sealing the cover to the container housing and preferably after the capacitor roll is secured within the housing or after encapsulating the capacitor components if a synthetic material such as epoxy is used in making the capacitor.

If the capacitor is loaded with a dielectric fluid, it is desirable to add the adsorbent material to the capacitor after the dielectric fluid has been added. The adsorbent material may be added by hand or by an automated operation. Since the density of the adsorbent material is typically greater than the dielectric fluid, the adsorbent material will naturally disperse downward through the dielectric fluid and therefore no special mixing operations are necessary. In addition, capacitors in normal use tend to cause pulsing and heating of the dielectric fluid which creates a slight turbulence therein allowing the adsorbent material to attain a consistently mixed state within the dielectric fluid.

The adsorbent material employed in the present invention may be used in all types of capacitors including metallized film capacitors of the wet and dry type, aluminum electrolytic, tantalum and ceramic capacitors by way of example.

DETAILED DESCRIPTION OF THE DRAWINGS

Figure 1:
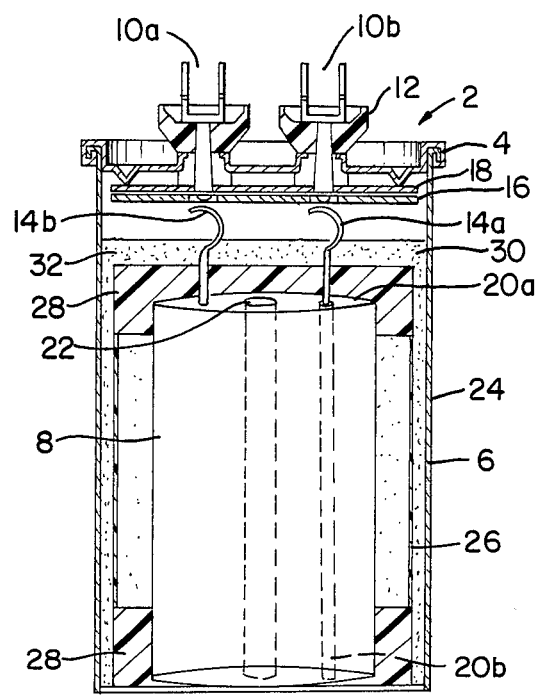
FIG. 1 is a cross-sectional view of a capacitor containing a dielectric fluid and an adsorbent material of the invention dispersed therein.

Referring to FIG. 1, there is shown a capacitor 2 including a cover 4, a container 6 and a single capacitor roll 8.

The cover 4 includes a pair of terminals 10a, 10b secured to the cover 4 by respective bushings 12. A mounting plate 18 located at the base of the cover 4 is also used to secure the terminals 10 and a phenolic bridge 16 is used as a substrate for an electrical connection between the capacitor roll 8 and the terminals 10.

The capacitor roll 8 as shown is formed by a continuous winding of an electrical inert or insulative material such as polypropylene or paper having thereon a metallized layer such as vaporized zinc around a core 22. The thickness of the insulative layer is typically in the range of 6 to 8 microns and the metallized layer about 15 Angstroms.

The so-called wet capacitor shown in FIG. 1 is loaded with a dielectric fluid 30. The adsorbent material 32 is added to the capacitor 2 by manually or automatically adding the desired amount to the container 6 with the cover 4 removed, preferably after the addition of the dielectric fluid 30.

The container 6 of the capacitor 2 may also be provided with means for insulating and protecting the capacitor roll 8. This can be accomplished by employing upper and lower insulating caps 28 and a sheath of insulation 26 between the capacitor roll 8 and the container 6 which are each typically made of polypropylene.

An electrical connection between the capacitor roll 8 and the terminals 10 are provided by taps 14a and 14b. One of the taps 14a is affixed (e.g., by soldering) to a metallized end 20a (e.g., zinc) of the capacitor roll 8 and the other tap 14b to an opposed metallized end 20b. This arrangment provides a continuous electrical connection between the wound layers of vaporized zinc within the capacitor roll 8 and the terminals 10.

The capacitor shown in FIG. 1 may be provided with more than one capacitor roll as is customarily employed in the art, especially where dual or multiple capacitance requirements are needed.

EXAMPLE 1

Six capacitors of the type shown in FIG. 1 and having a rated voltage of 370 volts and a capacitance of 25 mfarads were loaded with polyproylene glycol. 4.2 g of ⅛ inch pellets of crystalline sodium aluminasilicate having a mean pore size of about 4 Angstroms (MS-1070 manufactured by Union Carbide Corporation) were added to each of the capacitors directly into the dielectric fluid. The cover was seated on the container and a seam formed therebetween by rolling the edge of the cap over the container.

The thus prepared capacitors were subjected to an extended life test by placing the capacitors into a temperature controlled environmental chamber. The capacitors were subjected to 465 volts at a frequency of 60 Hertz under thermal cycle conditions wherein the temperature was gradually raised from room temperature to 80° C. and then lowered to room temperature and the cycle thereafter repeated.

Figure 2:
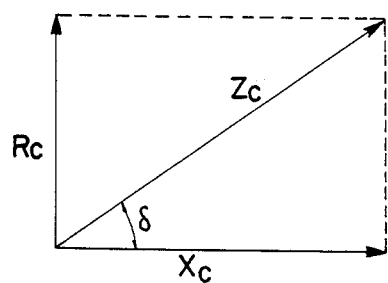
FIG. 2 is a graph showing how to compute the dissipation factor of a capacitor.
Figure 3A:
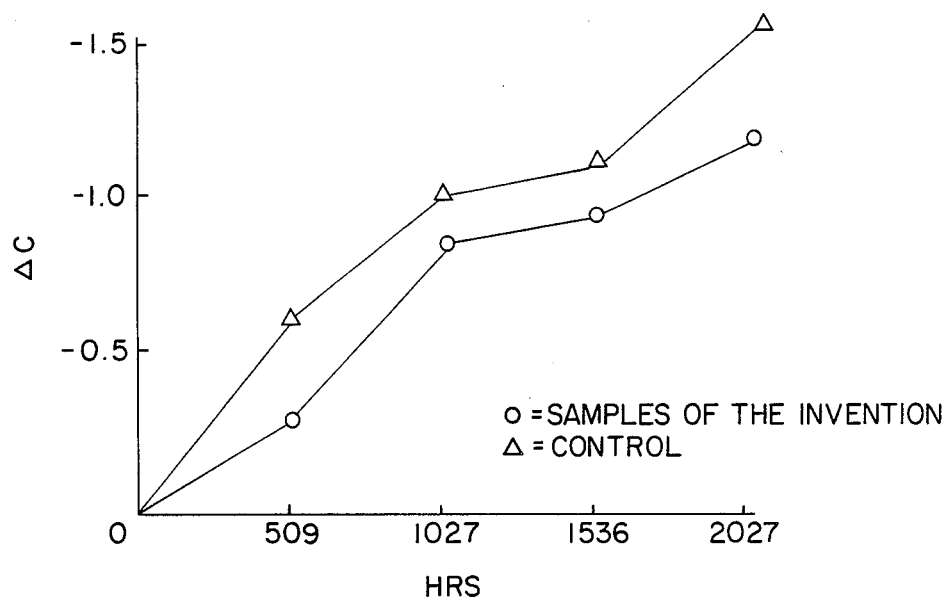
FIG. 3A is a graph comparing the loss of capacitance of the capacitors of the invention described in Example 1 with control capacitors.
Figure 3B:
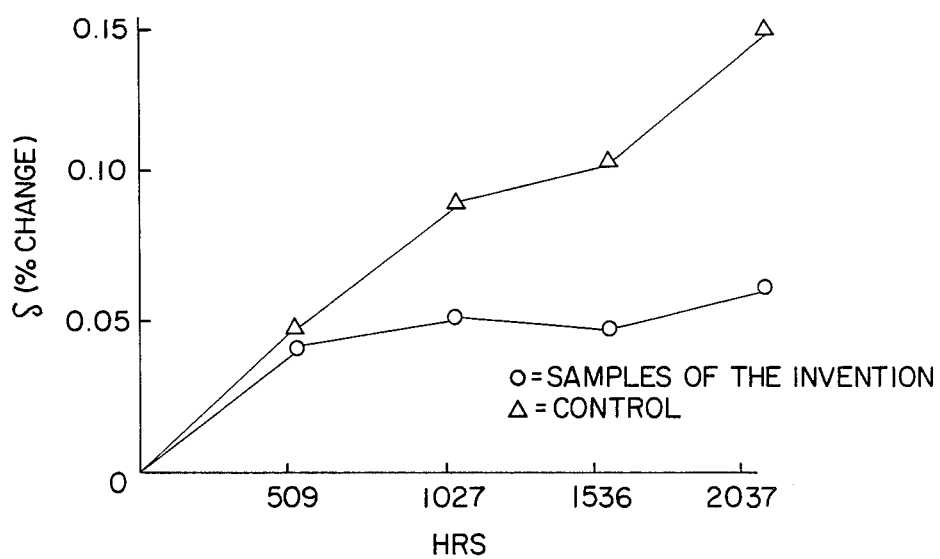
FIG. 3B is a graph comparing the rate of dissipation of electrical energy of the capacitors of the invention described in Example 1 with control capacitors.

The loss of capacitance and the rate of electrical energy loss (i.e., the dissipation factor; measured as the change in percent of the tangent of the angle between the reactance Xc and the impedance Zc of the capacitor as shown in FIG. 2) are numerically shown in Table 1 and graphically illustrated in FIGS. 3A and 3B, respectively after about 500, 1000, 1500 and 2000 hours.

As a control experiment the same capacitors described herein but without the adsorbent material were prepared and tested in the same manner and the results are likewise shown in Table 1 and FIGS. 3A and 3B, respectively.

TABLE 1

| | LOSS OF CAPACITANCE | | | |
|---|---|---|---|---|
| Sample/Control | 509 Hrs | 1027 Hrs | 1536 Hrs | 2027 Hrs |
| Samples 1–6* (average) | −.33 | −.73 | −.84 | −1.13 |
| Control Samples* (average) | −.58 | −.90 | −1.07 | −1.50 |

*The loss of capacitance values shown herein are an average value of the six samples and control samples.

As shown in FIG. 3 and Table 1 the samples of the present invention showed a sharply reduced loss of capacitance over the control samples during the entire extended life test.

TABLE 2

| | RATE OF ELECTRICAL ENERGY LOSS (Dissipation Factor) | | | |
|---|---|---|---|---|
| Sample/Control | 509 Hrs | 1027 Hrs | 1536 Hrs | 2027 Hrs |
| Samples 1–6 (average) | .039 | .048 | .043 | .050 |
| Control Samples (average) | .047 | .074 | .097 | .138 |
| Samples 1–6 Standard Deviation | .006 | .008 | .011 | .011 |
| Control Samples Standard Deviation | .008 | .019 | .035 | .060 |

Referring to TABLE 2 and FIG. 3B, the samples of the present invention showed a much lower average electrical energy loss than the control samples. In addition, the average standard deviation of electrical energy loss for the present samples was in a much narrower range than the control samples which is indicative of much fewer capacitor failures during the extended life test.

EXAMPLE 2

Six capacitors (Samples 7–12) having dual capacitance sections (i.e., 2 capacitor rolls, each having a rated voltage of 370 volts with one roll having a capacitance of 5 mfarads and the other 15 mfarads) were subjected to an extended life test at 410 volts under thermal cycle conditions ranging from room temperature to 100° C. to evaluate loss of capacitance and electrical energy loss. The capacitors of this example were prepared in the same manner as the capacitors described in Example 1. The results are shown in TABLES 3 and 4 and FIGS. 4A–4D.

TABLE 3

| | LOSS OF CAPACITANCE | | |
|---|---|---|---|
| Samples/Controls | 500 Hrs | 1000 Hrs | 1500 Hrs |
| Samples 7–12 5 mfarads (average) | −.037 | −.060 | −.892 |
| Control Samples (average) | −.046 | −.092 | −1.692 |
| Samples 7–12 15 mfarads (average) | −.049 | −.80 | −1.015 |
| Control Samples (average) | −.064 | −1.36 | −2.21 |

Figure 4A:
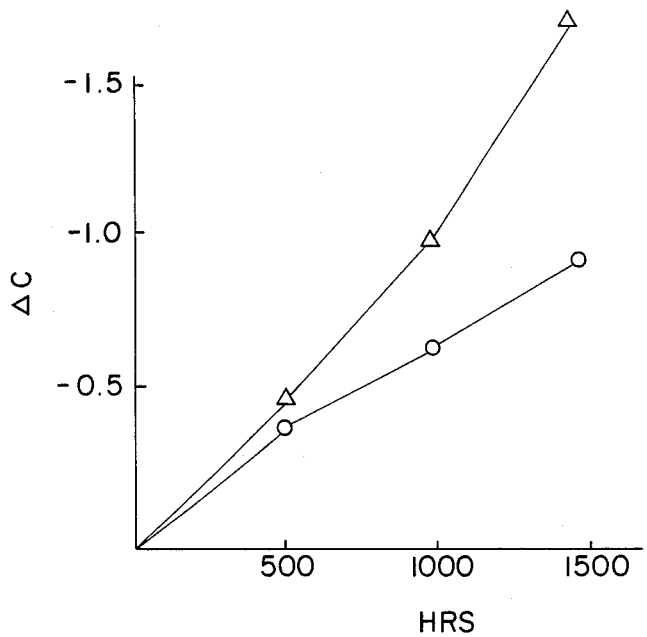
FIG. 4A is a graph comparing the loss of capacitance of the 5 mfarad capacitor sections described in Example 2 with control capacitors.
Figure 4B:
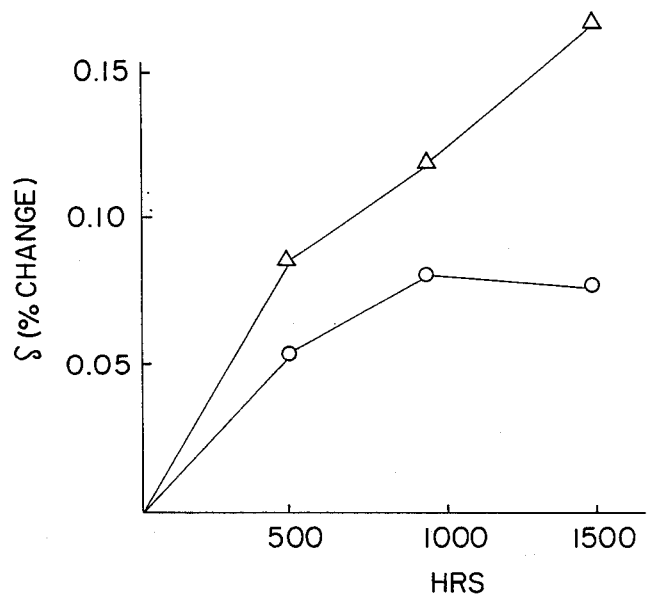
FIG. 4B is a graph comparing the rate of dissipation of electrical energy of the 5 mfarad capacitor sections described in Example 2 with control capacitors.

As shown in TABLE 3 and FIGS. 4A and 4B, Samples 7–12 of the present invention exhibited a markedly better loss of capacitance rating over the control samples for the entire length of the extended life test for the 5 mfarad capacitor sections.

Figure 4C:
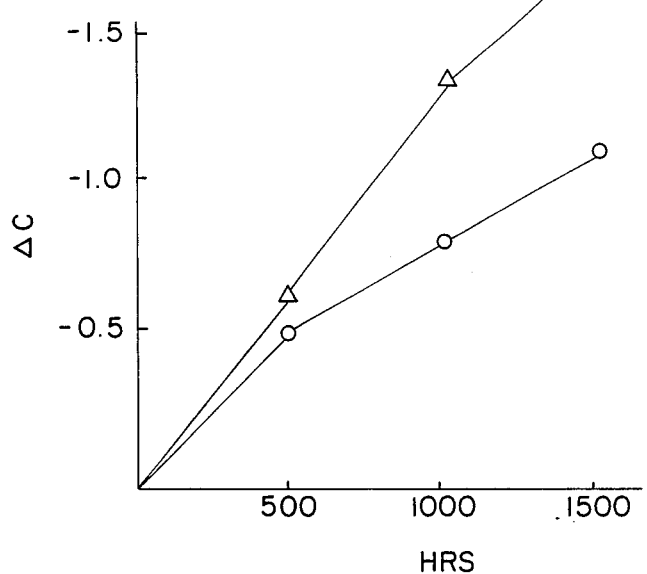
FIG. 4C is a graph comparing the loss of capacitance of the 15 mfarad capacitor sections described in Example 2 with control capacitors.
Figure 4D:
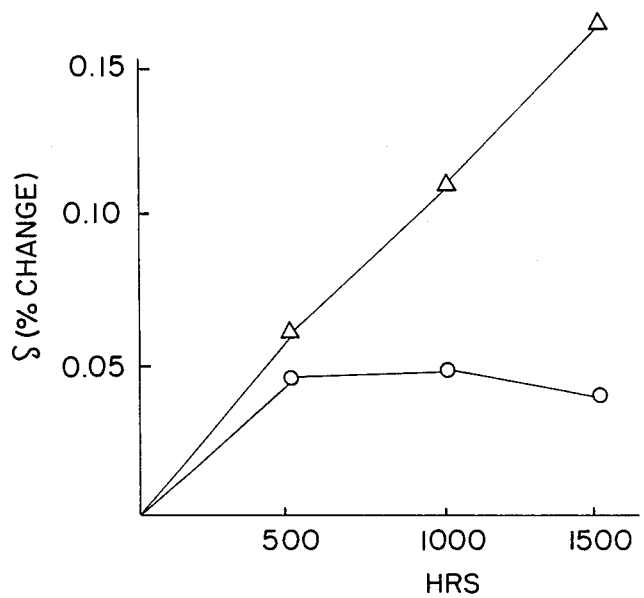
FIG. 4D is a graph comparing the rate of dissipation of electrical energy of the 15 mfarad capacitor sections described in Example 2 with control capacitors.

Referring to TABLE 4 and FIGS. 4C and 4D each of the capacitors described in Example 2 were tested for loss of electrical energy (dissipation factor) during the extended life test. The capacitors of the present invention manifested a significant reduction in loss of electrical energy and a much narrower standard of deviation range which is indicative of a much lower percentage of capacitor failures compared with the controls.

TABLE 4

| | RATE OF ELECTRICAL ENERGY LOSS (Dissipation Factor) | | |
|---|---|---|---|
| Sample/Control | 500 Hrs | 1000 Hrs | 1500 Hrs |
| Samples 7–13 5 mfarads (average) | .0525 | .0703 | .0680 |
| Control Samples 5 mfarads (average) | .0738 | .1212 | .1730 |
| Samples 7–13 5 mfarads Standard Deviation (average) | .0131 | .0324 | .0350 |
| Control Samples Standard Deviation (average) | .0178 | .0349 | .0630 |
| Samples 7–13 15 mfarads (average) | .0443 | .0453 | .0360 |
| Control Samples 15 mfarads (average) | .0663 | .1063 | .1580 |
| Samples 7–13 15 mfarads Standard Deviation (average) | .0049 | .0048 | .0012 |
| Control Samples 15 mfarads Standard Deviation (average) | .0069 | .0266 | .0733 |

I claim:

1. A capacitor comprising:
   (a) a housing;
   (b) means within the housing for storing and releasing electrical energy;
   (c) at least two terminals electrically connected to the electrical storing means; and
   (d) means in said housing for adsorbing at least a portion of the contaminants present in said capacitor, said absorbing means selected from synthetic and natural zeolites containing at least a predominant amount of crystalline sodium aluminasilicate, diatomaceous earth, activated carbon and alumina.

2. The capacitor of claim 1, wherein the contaminants are selected from at least one of polar compounds and polar molecules.

3. The capacitor of claim 2, wherein the contaminants are selected from water, carbon dioxide, ammonia, hydrogen chloride, chlorine gas, sulfur dioxide, isopropanol, formaldehyde, sodium chloride, trichloromethane, and carbon tetrachloride.

4. The capacitor of claim 3, wherein the contaminant is water.

5. The capacitor of claim 1, wherein the adsorbing means is in the form selected from a powder, beads, pellets, and combinations thereof.

6. The capacitor of claim 5, wherein the adsorbing means has a pore size adapted to adsorb water.

7. The capacitor of claim 1, wherein the amount of adsorbing means in said capacitor is sufficient to adsorb at least a major portion of the contaminants therein.

8. The capacitor of claim 1, wherein the amount of adsorbing means in said capacitor is about 4 to 4.5 grams.

9. The capacitor of claim 1, wherein the housing is a metal container and the means for storing and releasing electrical energy comprises at least one roll comprising a plurality of layers of an electrically inert material each having thereon a thin layer of an electrical conductor.

10. The capacitor of claim 9, wherein the electrically inert material is selected from plastic and paper and the electrical conductor is a metal.

11. The capacitor of claim 10, wherein the plastic is polypropylene.

12. The capacitor of claim 11, wherein the metal is zinc.

13. The capacitor of claim 1, wherein the capacitor further comprises means for suppressing a partial discharge.

14. The capacitor of claim 13, wherein the partial discharge suppressing means is a dielectric fluid.

15. The capacitor of claim 14, wherein the dielectric fluid is polypropylene glycol.

16. The capacitor of claim 1, wherein the housing is a layer of a synthetic material.

17. A capacitor comprising:
 (a) a housing;
 (b) at least one capacitor roll comprising wound layers of an electrically inert material each having thereon a layer of vaporized metal;
 (c) at least two terminals electrically connnected to the at least one capacitor roll;
 (d) at least one adsorbent material in said housing selected from synthetic and natural zeolites in the form of a powder, bead, pellet or combination thereof in an amount sufficient to adsorb a substantial amount of contaminants present in said capacitor.

18. The capacitor of claim 17, wherein the capacitor further comprises a dielectric fluid.

19. The capacitor of claim 17, wherein the electrically inert material is selected from polypropylene and paper.

20. The capacitor of claim 17, wherein the adsorbent material comprises crystalline sodium aluminasilicate having a mean pore size of about 4 Angstroms in an amount of about 4 to 4.5 grams.

* * * * *